US012656900B2

(12) United States Patent
Kim et al.

(10) Patent No.: US 12,656,900 B2
(45) Date of Patent: Jun. 16, 2026

(54) SMART WATCH

(71) Applicant: HIDEEP INC., Seongnam-si (KR)

(72) Inventors: Jongsik Kim, Seongnam-si (KR);
Youngho Cho, Seongnam-si (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 18/864,943

(22) PCT Filed: May 4, 2023

(86) PCT No.: PCT/KR2023/006136
§ 371 (c)(1),
(2) Date: Nov. 12, 2024

(87) PCT Pub. No.: WO2023/219342
PCT Pub. Date: Nov. 16, 2023

(65) Prior Publication Data
US 2025/0315120 A1      Oct. 9, 2025

(30) Foreign Application Priority Data

May 12, 2022    (KR) ........................ 10-2022-0058226

(51) Int. Cl.
G06F 3/041         (2006.01)
(52) U.S. Cl.
CPC .......... G06F 3/0416 (2013.01); G06F 3/0412 (2013.01)
(58) Field of Classification Search
None
See application file for complete search history.

(56) References Cited

U.S. PATENT DOCUMENTS 9,454,256 B2 *   9/2016  Fisher ................... G06F 1/1626
2008/0007539 A1 *  1/2008  Hotelling ............. G06F 3/0443
                                            345/173
2008/0047765 A1 *  2/2008  Proctor .............. G06F 3/03547
                                            178/18.06
2015/0212627 A1 *  7/2015  Hotelling ............. G06F 3/0445
                                            345/174
(Continued)

FOREIGN PATENT DOCUMENTS

CN        107544624 A      1/2018
KR       20150082031 A      7/2015
(Continued)

OTHER PUBLICATIONS

Korean Office Action 0-2022-0058226 , Issued on Apr. 18, 2024.
Korean Office Action 10-2022-0058226 , Issued on Dec. 23, 2024.

*Primary Examiner* — Ryan A Lubit
(74) *Attorney, Agent, or Firm* — The Belles Group, P.C.

(57)            ABSTRACT
The present invention relates to a smart watch and, more specifically, to a smart watch that can have improved wheel touch sensitivity.
The smart watch according to one embodiment of the present invention comprises: a display module including a cover member, a display unit, which is disposed under the cover member and has a touch sensor including a plurality of electrode patterns, and a substrate disposed under the display unit; a guide which is arranged to encompass the cover member and the display unit, and which is made of an insulating material; a wheel touch sensor which is arranged to encompass the display unit, and which is disposed under the guide; and an external case arranged to encompass the guide.

17 Claims, 4 Drawing Sheets

(56)           References Cited

U.S. PATENT DOCUMENTS

| | | | |
|---|---|---|---|
| 2016/0048246 A1* | 2/2016 | Park | G06F 3/04166 |
| | | | 345/173 |
| 2016/0202826 A1* | 7/2016 | Han | G06F 3/0412 |
| | | | 345/174 |
| 2016/0255732 A1* | 9/2016 | Lee | G04B 21/08 |
| | | | 361/679.01 |
| 2016/0291710 A1* | 10/2016 | Kang | G06F 3/0487 |
| 2016/0328078 A1* | 11/2016 | Lee | G06F 3/0443 |
| 2017/0060100 A1* | 3/2017 | Loi | G04G 9/0064 |
| 2017/0235409 A1* | 8/2017 | Chae | G06F 3/0362 |
| | | | 345/173 |
| 2018/0203590 A1* | 7/2018 | Loi | G06F 3/0412 |
| 2018/0246642 A1* | 8/2018 | Kachi | G06F 3/04883 |
| 2019/0354215 A1* | 11/2019 | King | G06F 1/169 |
| 2020/0012371 A1* | 1/2020 | Yang | G06F 3/0416 |
| 2020/0019009 A1* | 1/2020 | Miyazaki | G06F 3/044 |
| 2020/0218205 A1* | 7/2020 | Gupta | G04G 21/08 |
| 2020/0388913 A1* | 12/2020 | Chai | G06F 3/04164 |

FOREIGN PATENT DOCUMENTS

| | | |
|---|---|---|
| KR | 20190100808 A | 8/2019 |
| KR | 20190100808 A1 | 8/2019 |

* cited by examiner

SMART WATCH

CROSS-REFERENCE TO RELATED APPLICATIONS

This U.S. Non-Provisional Patent Application is a U.S. National Stage Application under 35 U.S.C. § 371 of Patent Cooperation Treaty (PCT) Application No. PCT/KR2023/006136, filed May 4, 2023, which claims priority to Korean Patent Application No. 10-2022-0058226, filed on May 12, 2022, the entire disclosures of all of which are hereby incorporated by reference herein, for all purposes.

TECHNICAL FIELD

The present invention relates to a smart watch, and more particularly, to a smart watch capable of improving wheel touch sensitivity.

BACKGROUND ART

Various kinds of input devices are used to operate a computing system. For example, the input devices such as a button, a key, a joystick, and a touch screen are used. Since the touch screen is easily and simply operated, the touch screen is increasingly used when operating the computing system.

As a technology is developed, a wearable computer is also increasingly developed. The wearable computer represents a computer that may be naturally worn on a body like clothing, watches, glasses, or accessories.

Although a smartphone and a tablet PC may be conveniently used with a finger or a single touch pen, there is an inconvenience such that the smartphone and the tablet PC are required to be stored in a pocket or bag or carried by hands.

However, since the wearable computer may be worn on a wrist or used like glasses, the wearable computer is more portable than the smartphone or the tablet PC. Particularly, a wrist watch which is a kind of the wearable computer and a kind of a touch input device and which is capable of wirelessly searching for various services such as diaries, messages, notifications, and stock prices, i.e., a smart watch, is developed into various products.

Some products having a circular touch screen typical exist among typical smart watches.

As an example of the typical products, there is Samsung's Galaxy watch series. Among the Galaxy watch series, there is a product having a physically rotatable wheel or bezel ring disposed on an outer portion of a circular touch screen. When a user physically rotates the wheel, various applications are executed on the circular touch screen, or the screen scrolls up or down.

On the other hand, some Galaxy watch products realize a wheel touch by software instead of having the physical wheel. The wheel touch is generated by a user such that the user moves a specific portion of an edge of the circular touch screen in a clockwise or counterclockwise direction while touches the specific portion. The wheel touch may execute various applications or scrolling up and down on the circular touch screen (hereinafter, referred to as a "digital wheel operation").

An example of the typical smart watch without the physical wheel will be described with reference to FIGS. 1 and 2.

FIG. 1 is a front view illustrating a typical smart watch having a circular touch screen without a physical wheel, and FIG. 2 is a schematic cross-sectional view taken along line A-A' of FIG. 1.

Referring to FIGS. 1 and 2, the typical smart watch includes a cover glass 11, a circular display unit 15 disposed below the cover glass 11 and having a touch sensor therein, a guide 30 surrounding an outer portion of each of the cover glass 11 and the circular display unit 15, and an external case 50 surrounding an outer portion of the guide 30.

Since the typical smart watch in FIGS. 1 and 2 does not have a physical wheel, the digital wheel operation is realized by software. However, when the user performs a wheel touch on an upper end of the guide 30 or an upper end of the external case 50, since a finger of the user is spaced relatively far from the touch sensor disposed in the display unit 15, the touch sensor may not properly recognize the finger of the user. In this case, although the user intentionally performs the wheel touch, the digital wheel operation may not occur on the corresponding smart watch, or an unintended operation (malfunction) may occur instead of an intended operation.

DISCLOSURE OF THE INVENTION

Technical Problem

The present invention provides a smart watch capable of recognizing a wheel touch of a user to stably and accurately realize a digital wheel touch operation.

The present invention also provides a smart watch capable of improving sensitivity of a wheel touch of a user.

Technical Solution

An embodiment of the present invention provide a smart watch including: a display module including a cover member, a display unit disposed below the cover member and having a touch sensor including a plurality of electrode patterns, and a substrate disposed below the display unit: a guide disposed to surround the cover member and the display unit, the guide made of an insulating material: a wheel touch sensor disposed to surround the display unit and disposed below the guide; and an external case disposed to surround the guide.

Here, the guide may have an inclined surface that is inclined toward the display unit, and the guide may cover the wheel touch sensor to insulate the wheel touch sensor from the display unit and the external case.

Here, the smart watch may further include a controller configured to control the touch sensor of the display unit and the wheel touch sensor and sense a touch position of an object disposed on the touch sensor and the wheel touch sensor based on a reception signal output from the touch sensor and the wheel touch sensor.

Here, the controller may drive the touch sensor and the wheel touch sensor in a normal active mode and then in a digital wheel mode, in the normal active mode, the controller may drive the plurality of electrode patterns of the touch sensor in one mode of a mutual-sensing mode or a self-sensing mode during a first time period and drive the wheel touch sensor in the self-sensing mode during a second time period after the first time period, and in the digital wheel mode, the controller may apply a wheel touch driving signal to the wheel touch sensor during a subsequent time period after the normal active mode and receive a wheel touch reception signal through the plurality of electrode patterns of the touch sensor.

Here, in the normal active mode, the controller may drive the plurality of electrode patterns of the touch sensor in the other mode of the mutual-sensing mode and the self-sensing mode during the second time period.

Here, the controller may drive the touch sensor and the wheel touch sensor in a normal active mode and then in a digital wheel mode, in the normal active mode, the controller may drive the plurality of electrode patterns of the touch sensor in a mutual-sensing mode during a first time period, drive the plurality of electrode patterns of the touch sensor in a self-sensing mode during a second time period after the first time period, and drive the wheel touch sensor in the self-sensing mode during a subsequent time period after the second time period, and in the digital wheel mode, the controller may apply a wheel touch driving signal to the wheel touch sensor during a subsequent time period after the normal active mode and receive a wheel touch reception signal through the plurality of electrode patterns of the touch sensor.

Here, the controller may drive the digital wheel mode when a wheel touch of the object is detected based on a self-reception signal received from the wheel touch sensor in the normal active mode.

Here, the subsequent time period after the normal active mode may include a third time period and a fourth time period after the third time period, and the controller may apply the wheel touch drive signal to the wheel touch sensor during the third and fourth time periods, and sense a position on an x-axis of the wheel touch during one time period of the third and fourth time periods and a position on a y-axis of the wheel touch during the other time period through the plurality of electrode patterns of the touch sensor.

Here, the touch sensor may have an orthogonal pattern structure, the subsequent time period after the normal active mode may include a third time period, and the controller may apply the wheel touch driving signal to the wheel touch sensor during the third time period and sense one of a position on an x-axis and a position on a y-axis of the wheel touch through the plurality of electrode patterns of the touch sensor during the third time period.

Here, the touch sensor may have a circular pattern structure, the subsequent time period after the normal active mode may include a third time period, and the controller may apply the wheel touch driving signal to the wheel touch sensor during the third time period and sense a position of the wheel touch through the plurality of electrode patterns of the touch sensor during the third time period.

In an embodiment of the present invention, a smart watch includes: a display module including a cover member, a display unit disposed below the cover member and having a touch sensor including a plurality of electrode patterns, and a substrate disposed below the display unit: a guide disposed to surround the cover member and the display unit, the guide made of a conductive material; an external case disposed to surround the guide: and an insulation member disposed between the guide and the external case.

Here, the smart watch may further include a controller configured to control the touch sensor of the display unit and the guide and sense a touch position of an object disposed on the touch sensor and the guide based on a reception signal output from the touch sensor and the guide.

Here, the controller may drive the touch sensor and the guide in a normal active mode and then in a digital wheel mode, in the normal active mode, the controller may drive the plurality of electrode patterns of the touch sensor in one mode of a mutual-sensing mode or a self-sensing mode during a first time period and drive the guide in the self-sensing mode during a second time period after the first time period, and in the digital wheel mode, the controller may apply a wheel touch driving signal to the guide during a subsequent time period after the normal active mode and receive a wheel touch reception signal through the plurality of electrode patterns of the touch sensor.

Here, in the normal active mode, the controller may drive the plurality of electrode patterns of the touch sensor in the other mode of the mutual-sensing mode and the self-sensing mode during the second time period.

Here, the controller may drive the touch sensor and the guide in a normal active mode and then in a digital wheel mode, in the normal active mode, the controller ma drive the plurality of electrode patterns of the touch sensor in one mode of a mutual-sensing mode or a self-sensing mode during a first time period, drive the plurality of electrode patterns of the touch sensor in the self-sensing mode during a second time period after the first time period, and drive the guide in the self-sensing mode during a subsequent time period after the second time period, and in the digital wheel mode, the controller may apply a wheel touch driving signal to the guide during a subsequent time period after the normal active mode and receive a wheel touch reception signal through the plurality of electrode patterns of the touch sensor.

Here, the controller may drive the digital wheel mode when a wheel touch of the object is detected based on a self-reception signal received from the guide in the normal active mode.

Here, the subsequent time period after the normal active mode may include a third time period and a fourth time period after the third time period, and the controller may apply the wheel touch driving signal to the guide during the third and fourth time periods, and sense a position on an x-axis of the wheel touch during one time period of the third and fourth time periods and a position on a y-axis of the wheel touch during the other time period through the plurality of electrode patterns of the touch sensor.

Here, the touch sensor may have an orthogonal pattern structure, the subsequent time period after the normal active mode may include a third time period, and the controller may apply the wheel touch driving signal to the guide during the third time period and sense one of a position on an x-axis and a position on a y-axis of the wheel touch through the plurality of electrode patterns of the touch sensor during the third time period.

Here, the touch sensor may have a circular pattern structure, the subsequent time period after the normal active mode may include a third time period, and the controller may apply the wheel touch driving signal to the guide during the third time period and sense a position of the wheel touch through the plurality of electrode patterns of the touch sensor during the third time period.

In an embodiment of the present invention, a smart watch includes: a display module including a cover member, a display unit disposed below the cover member and having a touch sensor including a plurality of electrode patterns, and a substrate disposed below the display unit: a guide disposed to surround the cover member and the display unit; and an external case disposed to surround the guide, the external case made of a conductive material.

Here, the guide may have an inclined surface that is inclined toward the display unit.

Here, the smart watch may further include a controller configured to control the touch sensor of the display unit and the external case and sense a touch position of an object disposed on the touch sensor and the external case based on a reception signal output from the touch sensor and the external case.

Here, the controller may drive the touch sensor and the external case in a normal active mode and then in a digital wheel mode, in the normal active mode, the controller may drive the plurality of electrode patterns of the touch sensor in one mode of a mutual-sensing mode or a self-sensing mode during a first time period and drive the external case in the self-sensing mode during a second time period after the first time period, and in the digital wheel mode, the controller may apply a wheel touch driving signal to the external case during a subsequent time period after the normal active mode and receive a wheel touch reception signal through the plurality of electrode patterns of the touch sensor.

Here, in the normal active mode, the controller may drive the plurality of electrode patterns of the touch sensor in the other mode of the mutual-sensing mode and the self-sensing mode during the second time period.

Here, the controller may drive the touch sensor and the external case in a normal active mode and then in a digital wheel mode, in the normal active mode, the controller may drive the plurality of electrode patterns of the touch sensor in one mode of a mutual-sensing mode or a self-sensing mode during a first time period and drive the external case in the self-sensing mode during a second time period after the first time period, and in the digital wheel mode, the controller may apply a wheel touch driving signal to the external case during a subsequent time period after the normal active mode and receive a wheel touch reception signal through the plurality of electrode patterns of the touch sensor.

Here, the controller may drive the digital wheel mode when a wheel touch of the object is detected based on a self-reception signal received from the external case in the normal active mode.

Here, the subsequent time period after the normal active mode may include a third time period and a fourth time period after the third time period, and the controller may apply the wheel touch driving signal to the external case during the third and fourth time periods, and sense a position on an x-axis of the wheel touch during one time period of the third and fourth time periods and a position on a y-axis of the wheel touch during the other time period through the plurality of electrode patterns of the touch sensor.

Here, the touch sensor may have an orthogonal pattern structure, the subsequent time period after the normal active mode may include a third time period, and the controller may apply the wheel touch driving signal to the external case during the third time period and sense one of a position on an x-axis and a position on a y-axis of the wheel touch through the plurality of electrode patterns of the touch sensor during the third time period.

Here, the touch sensor may have a circular pattern structure, the subsequent time period after the normal active mode may include a third time period, and the controller may apply the wheel touch driving signal to the external case during the third time period and sense a position of the wheel touch through the plurality of electrode patterns of the touch sensor during the third time period.

Advantageous Effects

When the smart watch according to the embodiment of the present invention is used, there is an advantage in that the wheel touch of the user may be clearly recognized to stably and accurately realize the digital wheel touch operation even without the physical wheel.

Also, there is an advantage of improving the sensitivity of the wheel touch of the user.

MODE FOR CARRYING OUT THE INVENTION

Figure 1:
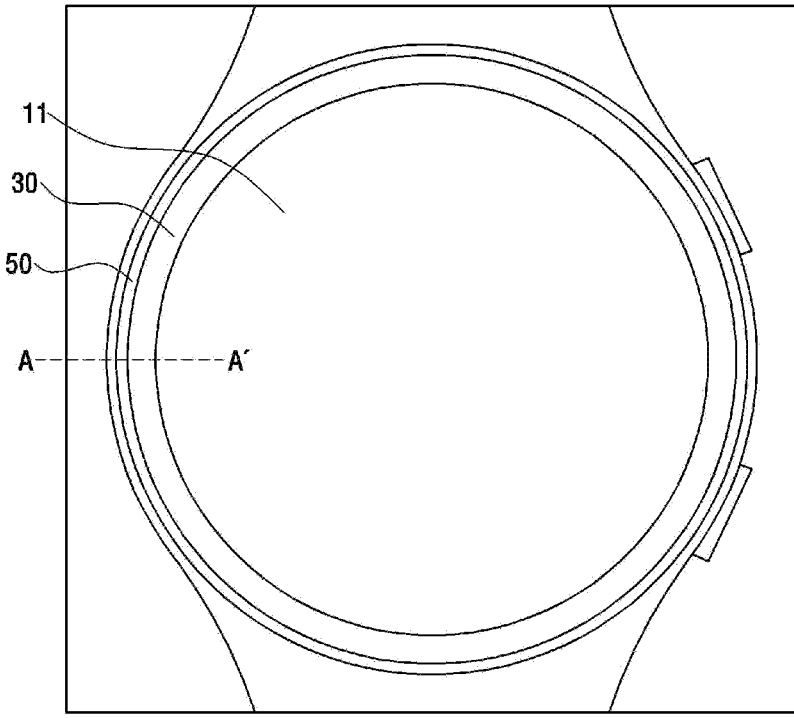
FIG. 1 is a front view illustrating a typical smart watch having a circular touch screen without a physical wheel.
Figure 2:
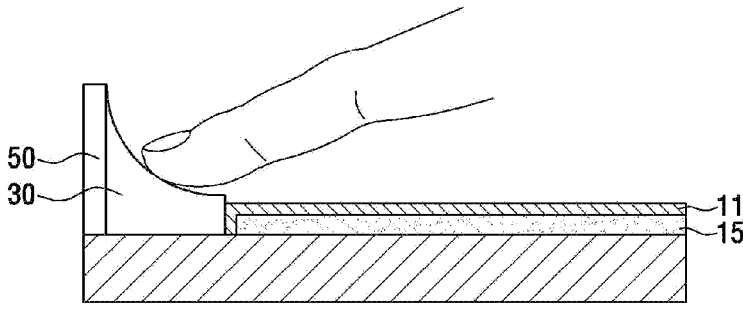
FIG. 2 is a schematic cross-sectional view taken along line A-A' of FIG. 1.

The present invention will now be described more fully with reference to the accompanying drawings, in which exemplary embodiments of the invention are shown. These embodiments are provided so that this disclosure will be thorough and complete, and will fully convey the concept of the invention to those skilled in the art. The invention may, however, be embodied in many different forms and should not be construed as being limited to the embodiments set forth herein. Therefore, it will be understood that the embodiments disclosed in this specification includes some variations without limitations to the shapes as illustrated in the figures. Also, the position or the arrangement of each component in the embodiment may be varied without departing form the spirit or scope of the invention. The preferred embodiments should be considered in descriptive sense only and not for purposes of limitation. Therefore, the scope of the invention is defined not by the detailed description of the invention but by the appended claims, and all differences within the scope will be construed as being included in the present invention. In the drawings, like reference numerals refer to like elements throughout.

Figure 3:
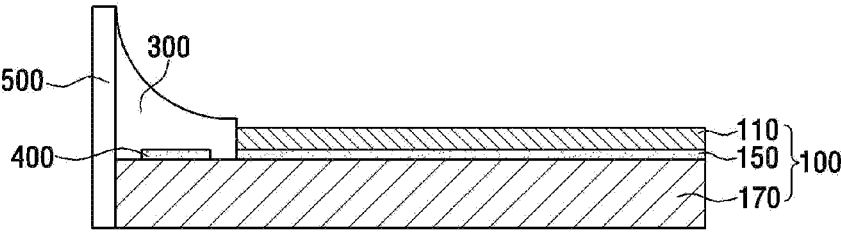
FIG. 3 is a cross-sectional view illustrating a portion of a smart watch according to an embodiment of the present invention.

FIG. 3 is a cross-sectional view illustrating a portion of a smart watch according to an embodiment of the present invention.

Referring to FIG. 3, the smart watch according to an embodiment of the present invention includes a display module 100, a guide 300, and an external case 500.

The smart watch according to an embodiment of the present invention further includes a controller (not shown). The controller (not shown) may control a touch sensor and a wheel touch sensor 400 and sense a touch position of an object, e.g., a finger of a user or a conductive object, disposed on the touch sensor and the wheel touch sensor 400 based on a reception signal output from the touch sensor and the wheel touch sensor 400. Also, the controller (not shown) may perform display driving that controls an image displayed on a display screen of the display unit 150. The controller (not shown) that is a single IC may perform touch and wheel sensing control in addition to the display driving. The controller (not shown) may include an IC for the display driving and an IC for the touch and wheel sensing control.

The display module 100 may include a substrate 170, a display unit 150 disposed on the substrate 170, and a cover member 110 disposed on the display unit 150.

The cover member 110 may be disposed to cover the display unit 150, thereby protecting the display unit 150. The cover member 110 may be also referred to as a cover glass.

The display unit 150 has a circular shape and includes a touch sensor (not shown). The touch sensor (not shown) may be disposed on one of the inside, a top surface, and a bottom surface of the display unit 150. The touch sensor (not shown) may include a plurality of electrode patterns. The plurality of electrode patterns of the touch sensor (not shown) may be driven in a self-sensing mode or a mutual-sensing mode by a controller (not shown) mounted in the smart watch.

When driven in the self-sensing mode, each of the plurality of electrode patterns may simultaneously emit a self-sensing driving signal and output a self-sensing reception signal during a predetermined time period. Alternatively, when driven in the self-sensing mode, each of the plurality of electrode patterns may emit a self-sensing driving signal during a first time period and then output a self-sensing reception signal during a second time period after the first time period. Whether a touch occurs in the output self-sensing reception signal may be determine through the controller (not shown). Here, the self-sensing reception signal may be an electrical signal of a voltage or current corresponding to a capacitance value at each electrode, and the controller (not shown) may detect a change of the capacitance value through the electrical signal to determine whether a touch occurs.

On the other hand, when driven in the mutual-sensing mode, the plurality of electrode patterns may include a plurality of driving electrode patterns and a plurality of receiving electrode patterns. When a touch driving signal is generated through at least one driving electrode pattern, a touch reception signal is output through at least one adjacent receiving electrode pattern. Whether a touch occurs in the output touch reception signal may be determined through the controller (not shown). Here, the touch reception signal may be an electrical signal of a voltage or current corresponding to a capacitance value between the driving electrode pattern and the receiving electrode pattern, and the controller (not shown) may detect a change of the capacitance value through the electrical signal to determine whether a touch occurs.

Figure 4A:
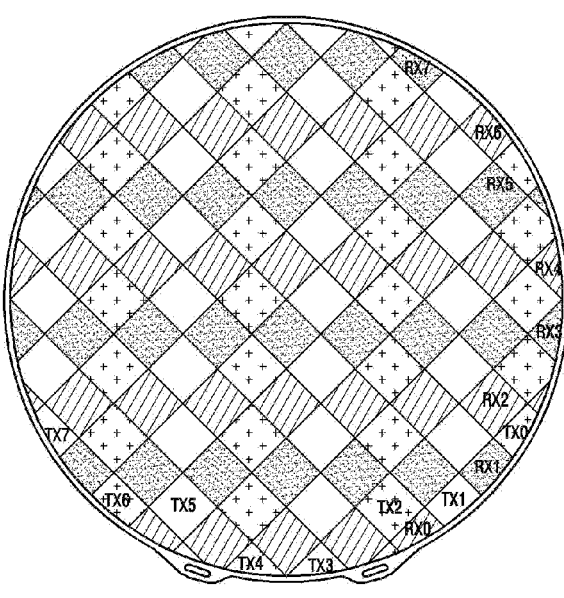
FIGS. 4A and 4B are views for explaining examples of a touch sensor in FIG. 3.
Figure 4B:
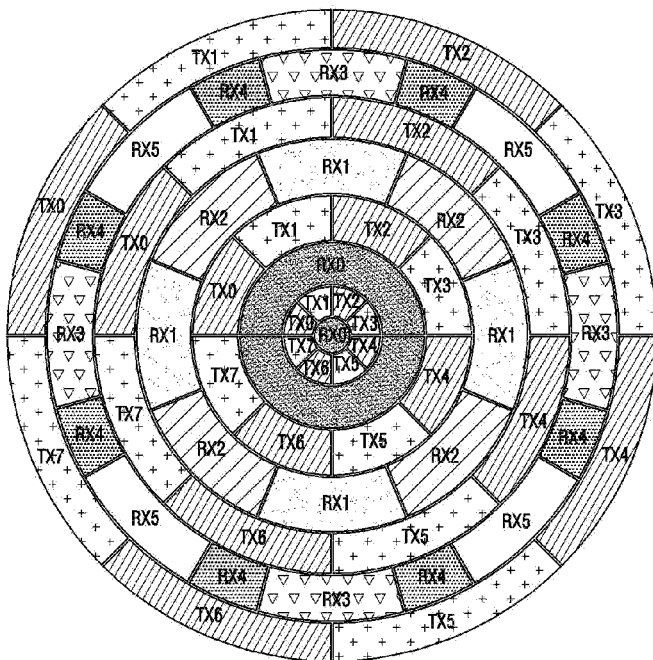

Some examples of the touch sensor (not shown) are illustrated in FIGS. 4A and 4B.

Referring to FIG. 4A, the touch sensor according to an embodiment includes a plurality of first electrodes TX0, TX1, TX2, TX3, TX4, TX5, TX6, and TX7, which are arranged in a row direction of one layer and a plurality of second electrodes RX0, RX1, RX2, RX3, RX4, RX5, RX6, and RX7, which are arranged in a column direction of the one layer. This is referred as an 'orthogonal pattern structure'.

Referring to FIG. 4B, a plurality of first electrodes TX0, TX1, TX2, TX3, TX4, TX5, TX6, and TX7) and a plurality of second receiving electrodes RX0, RX1, RX2, RX3, RX4, and RX5 are spaced apart from each other on a plurality of virtual concentric circles sharing a common center on one layer. This is referred to as a 'circular pattern structure'.

Referring to FIG. 3 again, the substrate 170 is disposed below the display unit 150. The display unit 150 may be disposed on a central portion of a top surface of the substrate 170. The wheel touch sensor 400 and the guide 300 may be disposed on an edge of the top surface of the substrate 170.

The controller (not shown) may provide a predetermined signal to the display unit 150 and the wheel touch sensor 400 through the substrate 170, and a signal output from the touch sensor and the wheel touch sensor 400 of the display unit 150 may be provided to the controller (not shown).

The substrate 170 may be a flexible PCB.

The guide 300 is made of an insulating material.

The guide 300 surrounds an outer portion of each of the display unit 150 and the cover member 110 of the display module 100.

The guide 300 is disposed on the edge of the top surface of the substrate 170 of the display module 100.

The guide 300 may have a wheel or ring shape and have an inclined surface that is inclined toward the display module 100. This inclined surface may have a downwardly convex curved surface.

The external case 500 surrounds an outer portion of the guide 300. The external case 500 may form an external shape of the smart watch.

The external case 500 may be electrically grounded.

The wheel touch sensor 400 is disposed on the substrate 170 of the display module 100. The wheel touch sensor 400 is disposed on the edge of the top surface of the substrate 170 The wheel touch sensor 400 may receive a predetermined driving signal from the controller (not shown) through the substrate 170.

The wheel touch sensor 400 is disposed below the guide 300. That is, the wheel touch sensor 400 is disposed between the guide 300 and the substrate 170.

The wheel touch sensor 400 may be covered by the guide 300. The guide 300 made of an insulating material may electrically insulate the wheel touch sensor 400 from each of the external case 500 and the display module 100.

The wheel touch sensor 400 may be spaced a predetermined distance from the display unit 150 of the display module 100 and include an electrode pattern having a wheel or ring shape that surrounds the circular display unit 150.

Alternatively, the wheel touch sensor 400 may include a conductive trace. One or a plurality of conductive traces that serve as the wheel touch sensor 400 may be disposed on the edge of the top surface of the substrate 170 of the display module 100. In this case, the wheel touch sensor 400 realized by the conductive traces may be a component contained in the display module 100.

The wheel touch sensor 400 may be disposed on the same layer as the display unit 150. However, the embodiment of the present invention is not limited thereto. For example, the wheel touch sensor 400 may be disposed on a layer different from that on which the display unit 150 is disposed.

The wheel touch sensor 400 may be controlled by the controller (not shown) disposed in the smart watch and driven in the self-sensing mode or the digital wheel mode.

When driven in the self-sensing mode, the wheel touch sensor 400 may simultaneously emit a self-sensing driving signal and output a self-sensing reception signal during a predetermined time period. Alternatively, when driven in the self-sensing mode, the wheel touch sensor 400 may emit the self-sensing drive signal during a first time period and then output the self-sensing reception signal during a second time period after the first time period. Whether a touch occurs in the output self-sensing reception signal may be determine through the controller (not shown). Here, the self-sensing reception signal may be an electrical signal of a voltage or current corresponding to a capacitance value at each electrode, and the controller (not shown) may detect a change of the capacitance value through the electrical signal to determine whether a touch occurs. Since the wheel touch sensor 400 is spaced a predetermined distance from the display unit 150, the wheel touch sensor 400 is hardly affected by a parasitic capacitance caused by the display unit 150. As a result, high self-sensing sensitivity may be expected.

On the other hand, a case of when driven in a digital wheel mode will be described with reference to FIG. 5.

Figure 5:
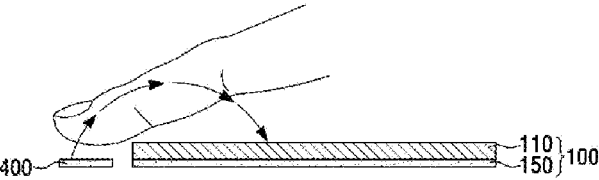
FIG. 5 is a view for explaining that a wheel touch sensor 400 of the smart watch according to an embodiment of the present invention in FIG. 3 is driven in a digital wheel mode.

FIG. 5 is a view for explaining a case of when the wheel touch sensor 400 of the smart watch in FIG. 3 according to an embodiment of the present invention is driven in the digital wheel mode.

For convenience of description, only the display module 100 and the wheel touch sensor 400 illustrated in FIG. 3 3 are illustrated in FIG. 5.

Referring to FIG. 5, in the digital wheel mode of the smart watch according to an embodiment of the present invention, an RF (or AC) capacitance sensing method may be used. The RF capacitance sensing method detects a change in electric field flowing through a human body such as a finger.

Specifically, when the wheel touch sensor 400 emits a wheel touch driving signal (RF or AC signal), the emitted wheel touch driving signal is transmitted to the touch sensor of the display unit 150 through a finger of the user. Here, the plurality of electrode patterns of the touch sensor of the display unit 150 serve as receiving electrode patterns, and the wheel touch reception signal output from each of the receiving electrode patterns is input to the controller (not shown). The controller (not shown) may detect a wheel touch of the user based on an intensity of the wheel touch reception signal, which is varied according to a distance between the finger of the user and each of the receiving electrode patterns.

As described above, the digital wheel mode of the wheel touch sensor 400 illustrated in FIG. 5 uses the plurality of electrode patterns of the touch sensor of the display unit 150 as a plurality of receiving electrode patterns. However, since the display unit 150 is also operated in the above-described self-sensing mode or mutual-sensing mode, a sensing method for appropriately driving the wheel touch sensor 400 and the touch sensor is required. Hereinafter, a touch sensing method according to an embodiment of the present invention will be described in detail with reference to FIG. 6.

Figure 6:
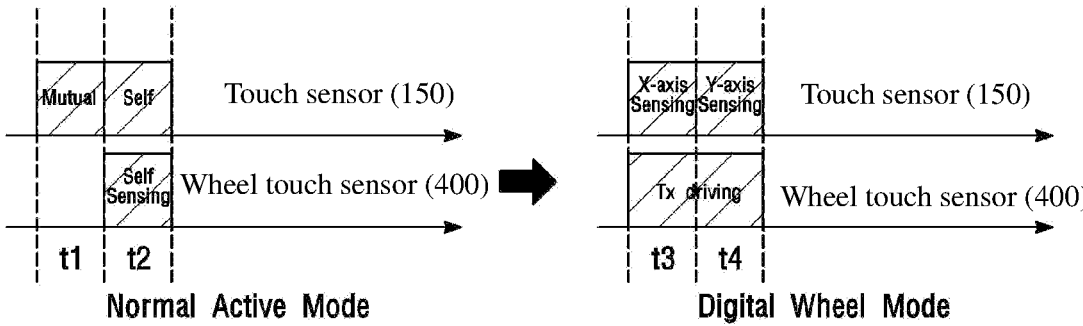
FIG. 6 is a view for explaining a touch sensing method of the smart watch according to an embodiment of the present invention in FIG. 3.

FIG. 6 is a view for explaining a touch sensing method of the smartwatch according to an embodiment of the present invention in FIG. 3.

The touch sensing method of the smart watch according to an embodiment of the present invention in FIG. 6 may be realized by controlling the touch sensor of the display unit 150 and the wheel touch sensor 400 in FIG. 3 by using the controller (not shown) mounted in the smart watch.

Referring to FIGS. 3 and 6, the touch sensing method of the smart watch according to an embodiment of the present invention includes: a first mode driving step in which the controller (not shown) drives the touch sensor of the display unit 150 and the wheel touch sensor 400 in a first mode and a second mode driving step in which the controller (not shown) drives the touch sensor of the display unit 150 and the wheel touch sensor 400 in a second mode.

In the first mode driving step, the first mode may be referred to as a normal active mode, and in the second mode driving step, the second mode may be referred to as a digital wheel mode.

Specifically, in the first mode driving step, the controller (not shown) drives the touch sensor of the display unit 150 in the mutual-sensing mode during a first time period t1 and then in the self-sensing mode during a second time period t2 after the first time period t1. Also, the controller (not shown) drives the wheel touch sensor 400 in the self-sensing mode during the second time period t2. Here, the controller (not shown) may not drive the wheel touch sensor 400 during the first time period t1.

Although not shown in the drawings, in the first mode driving step, the controller (not shown) may drive the wheel touch sensor 400 in the self-sensing mode during the second time period t2 instead of driving the touch sensor of the display unit 150 in the self-sensing mode.

Alternatively, in the first mode driving step, the controller (not shown) may drive the touch sensor of the display unit 150 in one of the mutual-sensing mode or the self-sensing mode during the first time period t1 and then drive the wheel touch sensor 400 in the self-sensing mode during the second time period t2.

Alternatively, in the first mode driving step, the controller (not shown) may drive the touch sensor of the display unit 150 in one mode of the mutual-sensing mode or the self-sensing mode during the first time period t1 and then in the other mode during the second time period t2, and drive the wheel touch sensor 400 in the self-sensing mode during a subsequent time period after the second time period t2.

As described in FIG. 5, in the second mode driving step, the controller (not shown) drives the wheel touch sensor 400 and the touch sensor of the display unit 150 in the digital wheel mode. Specifically, the controller (not shown) may control a wheel touch driving signal to be applied to the wheel touch sensor 400 during a third time period t3 and a fourth time period t4 after the first mode driving step and receive a wheel touch receiving signal through the touch sensor of the display unit 150. Here, the controller (not shown) may perform x-axis sensing through the touch sensor of the display unit 150 during the third time period t3 and y-axis sensing through the touch sensor during the fourth time period t4. For the x-axis and y-axis sensing, the touch sensor of the display unit 150 may have the orthogonal pattern structure illustrated in FIG. 4A. Alternatively, although not shown in the drawings, the controller (not shown) may control the wheel touch driving signal to be applied to the wheel touch sensor 400 during the third time period t3 after the first mode driving step and perform one of the x-axis sensing or the y-axis sensing of the wheel touch through the touch sensor of the display unit 150 during the third time period t3.

On the other hand, when the touch sensor of the display unit 150 has a circular pattern structure illustrated in FIG. 4B, the controller (not shown) may control the wheel touch driving signal to be applied to the wheel touch sensor 400 during the third time period t3 and sense a touch position of the wheel touch through the electrode patterns TX0 to TX7 and RX0 to RX5 of the touch sensor of the display unit 150 during the third time period t3.

The controller (not shown) may sequentially repeat the above-described controls in the first to fourth time periods t1, t2, t3, and t4. Here, the third and fourth time periods t3 and t4 may be the same as or different from the first and second time periods t1 and t2. For example, the third and fourth time periods t3 and t4 may be shorter than the first and second time periods t1 and t2. This may reduce power consumption in the second mode.

On the other hand, the controller (not shown) may control the second mode driving step to be performed only when a specific condition is satisfied in the first mode driving step. Specifically, when the wheel touch of the user is detected through the self-sensing mode of the wheel touch sensor 400 in the first mode driving step, the controller (not shown) may control the second mode driving step to be performed. This may reduce the power consumption of the smart watch because the second mode is driven only when the wheel touch of the user is detected.

Figure 7:
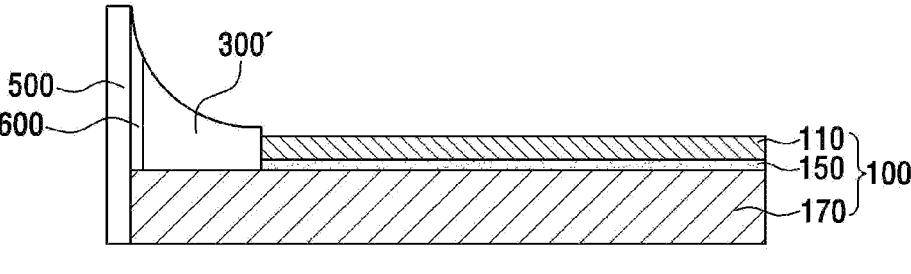
FIG. 7 is a cross-sectional view illustrating a portion of a smart watch according to another embodiment of the present invention.

FIG. 7 is a cross-sectional view illustrating a portion of a smart watch according to another embodiment of the present invention.

The smart watch according to another embodiment of the present invention in FIG. 7 is different from the smart watch according to an embodiment of the present invention in FIG. 3 in that the smart watch does not include the wheel touch sensor 400 and has a difference in a guide 300' and an insulating member 600. Since the rest components such as the display module 100 and the external case 500 are the same, descriptions thereof will be replaced with previous descriptions.

The smart watch according to another embodiment of the present invention in FIG. 7 includes the guide 300', which is different from the guide 300 in FIG. 3 in that the guide 300' is made of a conductive metal material.

The guide 300' surrounds an outer portion of each of the display unit 150 and the cover member 110 of the display module 100. Here, the guide 300' and the display unit 150 may be spaced a predetermined distance from each other, or a separate insulation member (e.g., insulation tape) may be disposed between the guide 300' and the display unit 150.

The guide 300' may have a wheel or ring shape and have an inclined surface that is inclined toward the display module 100. This inclined surface may have a downwardly convex curved surface.

The guide 300' serves as the wheel touch sensor described in FIG. 3.

The guide 300' may be controlled by a controller (not shown) disposed in the smart watch and driven in the self-sensing mode and/or the digital wheel mode.

When driven in the self-sensing mode, the guide 300' may simultaneously emit a self-sensing driving signal and output a self-sensing reception signal during a predetermined time period. When driven in the self-sensing mode, the guide 300' may emit the self-sensing driving signal during a first time period and output the self-sensing reception signal during a second time period after the first time period. Whether a touch occurs in the output self-sensing reception signal may be determine through the controller (not shown). Here, the self-sensing reception signal may be an electrical signal of a voltage or current corresponding to a capacitance value at each electrode, and the controller (not shown) may detect a change of the capacitance value through the electrical signal to determine whether a touch occurs. Since the guide 300' is spaced apart from the touch sensor of the display unit 150, the guide 300' is hardly affected by a parasitic capacitance caused by the display unit 150. Thus, high self-sensing sensitivity may be expected.

On the other hand, when driven in the digital wheel mode described in FIG. 5, the guide 300' emits a wheel touch driving signal (RF or AC signal), and the emitted wheel touch driving signal is transmitted to the touch sensor of the display unit 150 through the finger of the user. Here, the plurality of electrode patterns of the touch sensor of the display unit 150 serve as receiving electrode patterns, and the wheel touch reception signal output from each of the receiving electrode patterns is input to the controller (not shown). The controller (not shown) may detect a wheel touch of the user based on an intensity of the wheel touch reception signal that is varied according to a distance between a fingerprint and each of the receiving electrode patterns.

The insulation member 600 is disposed between the guide 300' and the outer case 500 to electrically insulate the guide 300' made of a metal material from the outer case 500.

The insulation member 600 may be, e.g., an insulation tape.

A touch sensing method of the smart watch according to another embodiment of the present invention in FIG. 7 may directly apply the methods described with reference to FIG. 6. However, when applying the above-described methods, the wheel touch sensor 400 in FIG. 6 is replaced with the guide 300'.

Specifically, the touch sensing method of the smart watch according to another embodiment of the present invention includes a first mode driving step in which the controller (not shown) drives the touch sensor of the display unit 150 and the guide 300' in a first mode and a second mode driving step in which the controller (not shown) drives the touch sensor of the display unit 150 and the guide 300' in a second mode.

In the first mode driving step, the first mode may be referred to as a normal active mode, and in the second mode driving step, the second mode may be referred to as a digital wheel mode.

Specifically, in the first mode driving step, the controller (not shown) drives the touch sensor of the display unit 150 in the mutual-sensing mode during a first time period t1 and then in the self-sensing mode during a second time period t2 after the first time period t1. Also, the controller (not shown) drives the guide 300' in the self-sensing mode during the second time period t2. Here, the controller (not shown) may not drive the guide 300' during the first time period t1.

Although not shown in the drawings, in the first mode driving step, the controller (not shown) may drive the guide 300' in the self-sensing mode during the second time period t2 instead of driving the touch sensor of the display unit 150 in the self-sensing mode.

Alternatively, in the first mode driving step, the controller (not shown) may drive the touch sensor of the display unit 150 in one of the mutual-sensing mode or the self-sensing mode during the first time period t1 and drive the guide 300' in the self-sensing mode during the second time period t2.

Alternatively, in the first mode driving step, the controller (not shown) may drive the touch sensor of the display unit 150 in one mode of the mutual-sensing mode or the self-sensing mode during the first time period t1 and in the other mode during the second time period t2, and then drive the guide 300' in the self-sensing mode in a subsequent time period after the second time period t2.

As described in FIG. 5, in the second mode driving step, the controller (not shown) drives the guide 300' and the touch sensor of the display unit 150 in the digital wheel mode. Specifically, the controller (not shown) may control the wheel touch drive signal to be applied to the guide 300' during a third time period t3 and a fourth time period t4 after the first mode driving step and receive the wheel touch reception signal through the touch sensor of the display unit 150. Here, the controller (not shown) may perform x-axis sensing through the touch sensor of the display unit 150 during the third time period t3 and y-axis sensing through the touch sensor during the fourth time period t4. For the x-axis and y-axis sensing, the touch sensor of the display unit 150 may have the orthogonal pattern structure illustrated in FIG. 4A. Alternatively, although not shown in the drawings, the controller (not shown) may control the wheel touch driving signal to be applied to the guide 300' during the third time period t3 after the first mode driving step and sense one of the x-axis or y-axis of the wheel touch through the touch sensor of the display unit 150.

On the other hand, when the touch sensor of the display unit 150 has the circular pattern structure in FIG. 4B, the controller (not shown) may control the wheel touch driving signal to be applied to the guide 300' during the third time period t3 and sense a touch position of a wheel touch through the electrode patterns TX0 to TX7 and RX0 to RX5 of the touch sensor of the display unit 150 during the third time period t3.

The controller (not shown) may sequentially repeat the above-described controls in the first to fourth time periods t1, t2, t3, and t4. Here, the third and fourth time periods t3 and t4 may be the same as or different from the first and second time periods t1 and t2. For example, the third and fourth time periods t3 and t4 may be shorter than the first and second time periods t1 and t2. This may reduce power consumption in the second mode.

On the other hand, the controller (not shown) may control the second mode driving step to be performed only when a specific condition is satisfied in the first mode driving step. Specifically, when the wheel touch of the user is detected through the self-sensing mode of the guide 300' in the first mode driving step, the controller (not shown) may controls the second mode driving step to be performed. This may reduce the power consumption of the smart watch because the second mode is driven only when the wheel touch of the user is detected.

Figure 8:
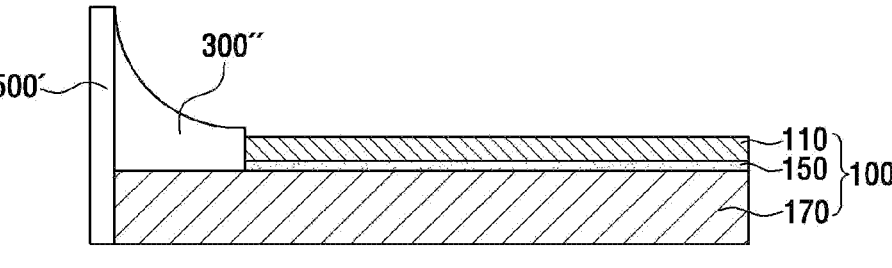
FIG. 8 is a cross-sectional view illustrating a portion of a smart watch according to another embodiment of the present invention.

FIG. 8 is a cross-sectional view illustrating a portion of a smart watch according to another embodiment of the present invention.

The smart watch according to another embodiment of the present invention in FIG. 8 is different from the smart watch according to an embodiment of the present invention in FIG. 3 in that the smart watch does not include the wheel touch sensor 400 and insulating member 600 and has a difference in a guide 300" and an external case 500'. Since the rest components of the display module 100 are the same, descriptions thereof will be replaced with previous descriptions.

The smart watch according to another embodiment of the present invention in FIG. 8 includes the guide 300", which is different from the guide 300' of FIG. 7 in that the guide 300" is made of an insulating material.

The external case 500' is made of a conductive metal material and serves as the wheel touch sensor described in FIG. 3.

The external case 500' may be controlled by the controller (not shown) disposed in the smart watch and driven in the self-sensing mode and/or the digital wheel mode. Detailed descriptions of the self-sensing mode or the digital wheel mode may be obtained by replacing the guide 300' with the external case 500' in the descriptions of the self-sensing mode or the digital wheel mode of the smart watch in FIG. 7. Thus, detail descriptions thereof will not be provided.

On the other hand, although not shown in the drawings, an insulation member may be additionally disposed between the external case 500' that serves as the wheel touch sensor and the guide 300".

Figure 9:
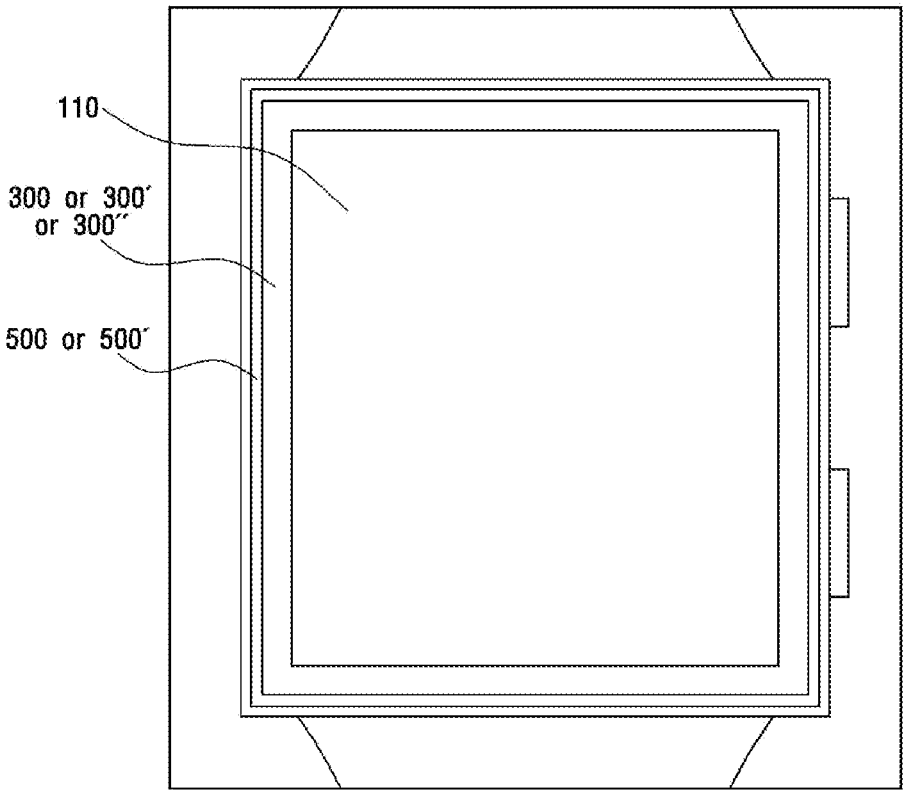
FIG. 9 is a view illustrating that the smart watches according to various embodiments of the present invention in FIGS. 3 to 8 may be applied to a rectangular smart watch.

The smart watch according to embodiments of the present invention in FIGS. 3 to 8 may be directly applied not only to the circular smart watch but also to a rectangular smart watch in FIG. 9. Furthermore, although not shown in the drawings, the smart watch according to the embodiments of the present invention in FIGS. 3 to 8 may be directly applied to polygonal, elliptical, trapezoidal, or diamond-shaped smart watches in addition to the rectangular smart watch.

Features, structures, and effects described in the above embodiments are incorporated into at least one embodiment of the present disclosure, but are not limited to only one embodiment. Moreover, features, structures, and effects exemplified in one embodiment can easily be combined and modified for another embodiment by those skilled in the art. Therefore, these combinations and modifications should be construed as falling within the scope of the present disclosure. Moreover, features, structures, and effects exemplified in one embodiment can easily be combined and modified for another embodiment by those skilled in the art. Therefore, these combinations and modifications should be construed as falling within the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A smart watch comprising:
   a display module comprising a cover member, a display unit disposed below the cover member and having a touch sensor comprising a plurality of electrode patterns, and a substrate disposed below the display unit;
   a guide disposed to surround the cover member and the display unit, the guide made of an insulating material;
   a wheel touch sensor disposed to surround the display unit and disposed below the guide;
   an external case disposed to surround the guide; and
   a controller configured to control the touch sensor of the display unit and the wheel touch sensor and sense a touch position of an object disposed on the touch sensor and the wheel touch sensor based on a reception signal output from the touch sensor and the wheel touch sensor,
   wherein the controller drives the touch sensor and the wheel touch sensor in a normal active mode and then in a digital wheel mode,
   in the normal active mode, the controller drives the plurality of electrode patterns of the touch sensor in one mode of a mutual-sensing mode or a self-sensing mode during a first time period and drives the wheel touch sensor or the plurality of electrode patterns of the touch sensor in the self-sensing mode during a second time period after the first time period, and
   in the digital wheel mode, the controller applies a wheel touch driving signal to the wheel touch sensor during a subsequent time period after the normal active mode and receives a wheel touch reception signal through the plurality of electrode patterns of the touch sensor.

2. The smart watch of claim 1, wherein the guide has an inclined surface that is inclined toward the display unit, and

the guide covers the wheel touch sensor to insulate the wheel touch sensor from the display unit and the external case.

3. The smart watch of claim 1, wherein in the normal active mode, the controller drives the wheel touch sensor in the self-sensing mode during a subsequent time period after the second time period.

4. The smart watch of claim 1, wherein the controller drives the digital wheel mode when a wheel touch of the object is detected based on a self-reception signal received from the wheel touch sensor in the normal active mode.

5. The smart watch of claim 1, wherein the subsequent time period after the normal active mode comprises a third time period and a fourth time period after the third time period, and the controller applies the wheel touch drive signal to the wheel touch sensor during the third and fourth time periods, and senses a position on an x-axis of the wheel touch during one time period of the third and fourth time periods and a position on a y-axis of the wheel touch during the other time period through the plurality of electrode patterns of the touch sensor.

6. The smart watch of claim 1, wherein the touch sensor has a circular pattern structure or an orthogonal pattern structure, the subsequent time period after the normal active mode comprises a third time period, and the controller applies the wheel touch driving signal to the wheel touch sensor during the third time period and senses a position of the wheel touch through the plurality of electrode patterns of the touch sensor during the third time period.

7. A smart watch comprising: a display module comprising a cover member, a display unit disposed below the cover member and having a touch sensor comprising a plurality of electrode patterns, and a substrate disposed below the display unit; a guide disposed to surround the cover member and the display unit, the guide made of a conductive material; an external case disposed to surround the guide; an insulation member disposed between the guide and the external case; a controller configured to control the touch sensor of the display unit and the guide and sense a touch position of an object disposed on the touch sensor and the guide based on a reception signal output from the touch sensor and the guide, wherein the controller drives the touch sensor and the guide in a normal active mode and then in a digital wheel mode, in the normal active mode, the controller drives the plurality of electrode patterns of the touch sensor in one mode of a mutual-sensing mode or a self-sensing mode during a first time period and drives the guide or the plurality of electrode patterns of the touch sensor in the self-sensing mode during a second time period after the first time period, and in the digital wheel mode, the controller applies a wheel touch driving signal to the guide during a subsequent time period after the normal active mode and receives a wheel touch reception signal through the plurality of electrode patterns of the touch sensor.

8. The smart watch of claim 7, wherein in the normal active mode, the controller drives the guide in the self-sensing mode during a subsequent time period after the second time period.

9. The smart watch of claim 7, wherein the controller drives the digital wheel mode when a wheel touch of the object is detected based on a self-reception signal received from the guide in the normal active mode.

10. The smart watch of claim 7, wherein the subsequent time period after the normal active mode comprises a third time period and a fourth time period after the third time period, and the controller applies the wheel touch driving signal to the guide during the third and fourth time periods, and senses a position on an x-axis of the wheel touch during one time period of the third and fourth time periods and a position on a y-axis of the wheel touch during the other time period through the plurality of electrode patterns of the touch sensor.

11. The smart watch of claim 7, wherein the touch sensor has a circular pattern structure or an orthogonal pattern structure, the subsequent time period after the normal active mode comprises a third time period, and the controller applies the wheel touch driving signal to the guide during the third time period and senses a position of the wheel touch through the plurality of electrode patterns of the touch sensor during the third time period.

12. A smart watch comprising: a display module comprising a cover member, a display unit disposed below the cover member and having a touch sensor comprising a plurality of electrode patterns, and a substrate disposed below the display unit; a guide disposed to surround the cover member and the display unit; an external case disposed to surround the guide, the external case made of a conductive material; a controller configured to control the touch sensor of the display unit and the external case and sense a touch position of an object disposed on the touch sensor and the external case based on a reception signal output from the touch sensor and the external case, wherein the controller drives the touch sensor and the external case in a normal active mode and then in a digital wheel mode, in the normal active mode, the controller drives the plurality of electrode patterns of the touch sensor in one mode of a mutual-sensing mode or a self-sensing mode during a first time period and drives the external case or the plurality of electrode patterns of the touch sensor in the self-sensing mode during a second time period after the first time period, and in the digital wheel mode, the controller applies a wheel touch driving signal to the external case during a subsequent time period after the normal active mode and receives a wheel touch reception signal through the plurality of electrode patterns of the touch sensor.

13. The smart watch of claim 12, wherein the guide has an inclined surface that is inclined toward the display unit.

14. The smart watch of claim 12, wherein in the normal active mode, the controller drives the external case in the self-sensing mode during a subsequent time period after the second time period.

15. The smart watch of claim 12, wherein the controller drives the digital wheel mode when a wheel touch of the object is detected based on a self-reception signal received from the external case in the normal active mode.

16. The smart watch of claim 12, wherein the subsequent time period after the normal active mode comprises a third time period and a fourth time period after the third time period, and the controller applies the wheel touch driving signal to the external case during the third and fourth time periods, and senses a position on an x-axis of the wheel touch during one time period of the third and fourth time periods and a position on a y-axis of the wheel touch during the other time period through the plurality of electrode patterns of the touch sensor.

17. The smart watch of claim 12, wherein the touch sensor has a circular pattern structure or an orthogonal pattern structure, the subsequent time period after the normal active mode comprises a third time period, and the controller applies the wheel touch driving signal to the external case during the third time period and senses a position of the wheel touch through the plurality of electrode patterns of the touch sensor during the third time period.

* * * * *